US010274303B2

(12) United States Patent
Savage et al.

(10) Patent No.: US 10,274,303 B2
(45) Date of Patent: Apr. 30, 2019

(54) MAJOR DIAMETER TOTAL RUNOUT GAGE FOR AN EXTERNAL SPLINE

(71) Applicant: Ford Motor Company, Dearborn, MI (US)

(72) Inventors: Jason Richard Savage, South Lyon, MI (US); Robert Thomas Kraus, Shelby Township, MI (US); Jay Kupiszewski, Warren, MI (US)

(73) Assignee: Ford Motor Company, Dearborn, MI (US)

( * ) Notice: Subject to any disclaimer, the term of this patent is extended or adjusted under 35 U.S.C. 154(b) by 67 days.

(21) Appl. No.: 15/619,898

(22) Filed: Jun. 12, 2017

(65) Prior Publication Data

US 2018/0356200 A1   Dec. 13, 2018

(51) Int. Cl.
*G01B 5/20* (2006.01)
*H01R 39/58* (2006.01)
*G01M 13/027* (2019.01)
*G01B 3/46* (2006.01)

(52) U.S. Cl.
CPC ............ *G01B 5/202* (2013.01); *G01M 13/027* (2013.01); *H01R 39/58* (2013.01); *G01B 3/46* (2013.01)

(58) Field of Classification Search
CPC .................................................. G01B 5/202
USPC ....................... 33/501.7, 600, 655
See application file for complete search history.

(56) References Cited

U.S. PATENT DOCUMENTS

| 2,643,306 | A | * | 6/1953 | Hamilton | B65H 63/02 200/61.18 |
| 5,325,599 | A | * | 7/1994 | Russell | F16C 19/364 33/517 |
| 6,612,042 | B1 | * | 9/2003 | McKinney | G01B 3/36 33/199 R |
| 6,796,031 | B1 | * | 9/2004 | Russell | F16C 19/364 29/407.02 |
| 7,290,352 | B2 | * | 11/2007 | Deferme | F16F 9/3488 33/600 |
| 2009/0100695 | A1 | * | 4/2009 | Muellner | B23Q 17/002 33/832 |
| 2013/0047451 | A1 | * | 2/2013 | Koumoto | G01B 21/042 33/501.7 |
| 2014/0130360 | A1 | * | 5/2014 | Ruden | G01D 5/145 33/1 PT |
| 2015/0233693 | A1 | * | 8/2015 | Senn | G01B 5/08 451/5 |
| 2017/0292822 | A1 | * | 10/2017 | Nakamori | G01B 5/202 |

FOREIGN PATENT DOCUMENTS

| CN | 201340249 | 11/2009 |
| CN | 201993078 | 9/2011 |
| CN | 202853533 | 4/2013 |

(Continued)

*Primary Examiner* — George B Bennett
(74) *Attorney, Agent, or Firm* — Burris Law, PLLC (57) ABSTRACT

A device and method for measuring dimensional variation of a part, particularly total runout, is provided. The device includes an indicator check body, a clamping device within the indicator check body and an end cap that engages the indicator check body and the clamping device. When the indicator check body and the clamping device are engaged, the device is secured to the part allowing dimensional variations to be measured along the surface of the indicator check body.

20 Claims, 8 Drawing Sheets

(56) References Cited

FOREIGN PATENT DOCUMENTS

| | | |
|---|---|---|
| CN | 103591868 | 2/2014 |
| EP | 2130021 | 8/2013 |
| KR | 100507237 | 8/2005 |

* cited by examiner

MAJOR DIAMETER TOTAL RUNOUT GAGE FOR AN EXTERNAL SPLINE

FIELD

The present disclosure relates to a device and method for improving the inspection and measurement of total runout of a surface, and more particularly to a device and method for improving the inspection and measurement of total runout of an external spline.

BACKGROUND

The statements in this section merely provide background information related to the present disclosure and may not constitute prior art.

Various applications utilize parts with an axis of rotation and splines on shafts. For example, gear transmissions in motor vehicles often include a hypoid driving pinion to transmit power, or torque, to drive axles. Often, the surfaces of splined parts vary from their nominal dimensions due to manufacturing variation and wear. Measuring the actual variation of splined surfaces can be challenging. Generally, variation can be measured by "runout" and "total runout."

Runout is how much a given reference feature or features vary with respect to another datum when a part is rotated 360° around a datum axis. Runout is typically a control for a circular feature and indicates how much radial variation the feature has about a rotational axis. Runout can be called out on any feature that is rotated about an axis.

Total runout is how much an entire feature or surface varies with respect to a datum when the part is rotated 360° around the datum axis. Total runout indicates both the amount of radial dimensional variation in the surface as the part is rotated and the amount of dimensional variation in the axial dimension. Both radial dimensional variation and axial dimensional variation are measured by total runout.

Because splined surfaces are not smooth, measuring runout and total runout can be challenging. The challenges of measuring dimensional variation of splined parts, among other types of parts, are addressed by the present disclosure.

SUMMARY

In one form of the present disclosure, a device for measuring dimensional variation of a part is provided that comprises an indicator check body, a clamping device disposed within the indicator check body, and an end cap adapted for engagement with the indicator check body and the clamping device. When the indicator check body and the clamping device are engaged, by the end cap, the device is secured to the part and dimensional variation is measure along at least one surface of the indicator check body. In another form, the device further comprises an anti-rotation member secured to the indicator check body, wherein the anti-rotation member is adapted to be secured to the part. The part in one form is a shaft having external splines, and the anti-rotation member defines a splined inner diameter configured to engage the external splines of the shaft. The clamping device comprises a collet disposed inside a collet actuator body and the indicator check body, and the collet actuator body defines an inner top surface that is adapted to engage an end portion of the part to locate the device relative to the part. In still another form, the end cap defines internal threads, and the indicator check body defines mating external threads. The end cap may further define an inner face that is adapted to engage an end portion of the clamping device. The end cap in one form further comprises a tool engagement feature. In another form, a fit between the indicator check body and the clamping device is a clearance fit.

In another form of the present disclosure a gage for measuring dimensional variation of a shaft having splines is provided. The gage comprises a collet, a collet actuator disposed around the collet, an indicator check body disposed around the collet actuator, an anti-rotation member secured to a distal end portion of the indicator check body and adapted to engage the splines of the shaft, and an end cap secured to a proximal end portion of the indicator check body. In one form, the anti-rotation member defines a splined inner diameter configured to engage the splines of the shaft. The collet actuator body defines an inner top surface that is adapted to engage an end portion of the shaft to locate the gage relative to the shaft. The end cap in one form defines internal threads, and the indicator check body defines mating external threads. Further, the end cap defines an inner face that is adapted to engage an end portion of the collet actuator and may also have a tool engagement feature. Also, a fit between the indicator check body and the collet actuator is a clearance fit in another form. The indicator check body in another form comprises an external flange defining at least one surface against which dimensional variation is measured.

Another form of the present disclosure includes a method of measuring dimensional variation of a shaft having splines. The method comprises positioning a gage over the shaft and engaging an anti-rotation member of the gage with splines of the shaft. The end cap is then tightened such that a collet clamps onto a major diameter of the splines. The gage and the shaft are rotated, and a probe is placed at a surface of the indicator check body to measure the dimensional variation of the shaft. In one form, the gage is rotated by engaging a tool with the end cap. The method may further comprise the step of engaging an inner top surface of the collet actuator body against an end portion of the shaft to locate the gage relative to the shaft.

These various components, devices, gages, features, and methods may be employed individually or in any combination as set forth herein while remaining within the scope of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1-4, a device for measuring dimensional variation of a part is illustrated and generally indicated by reference numeral 20. As shown, the device 20 comprises and an indicator check body 22, a clamping device 24 disposed within the indicator check body 22, and an end cap 26 adapted for engagement with the indicator check body 22 and the clamping device 24. The device 20 further includes an anti-rotation member 28, which in one form is a ring as shown, secured to the indicator check body 22. As described in greater detail below, the anti-rotation member 28 is adapted to be secured to a part to be measured for dimensional variation.

Figure 5:
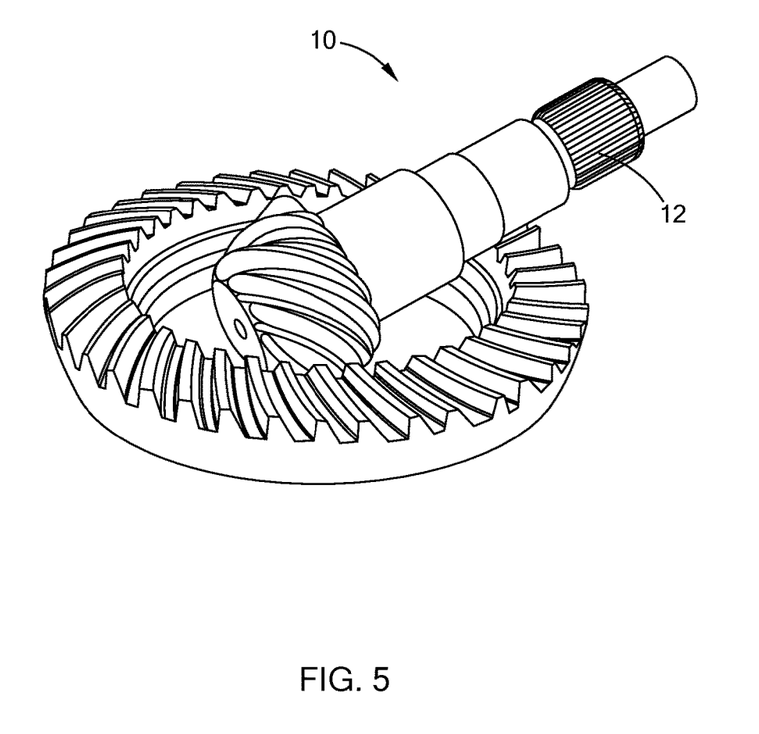
FIG. 5 is a perspective view of a splined shaft onto which the device of FIG. 1 is attached for dimensional measurement.

Referring briefly to FIG. 5, the part to be measured for dimensional variation by the device 20 in one form is a shaft 10 having external splines 12. Accordingly, the anti-rotation member 28 defines a splined inner diameter 30 (best shown in FIGS. 3A and 3B) configured to engage the external splines 12 of the shaft 10 when the device 20 is installed, which is described in greater detail below. Also, the device 20 in one form is a gage for measuring the dimensional variation, which may include by way of example runout and total runout, among other geometric dimensions.

Figure 1:
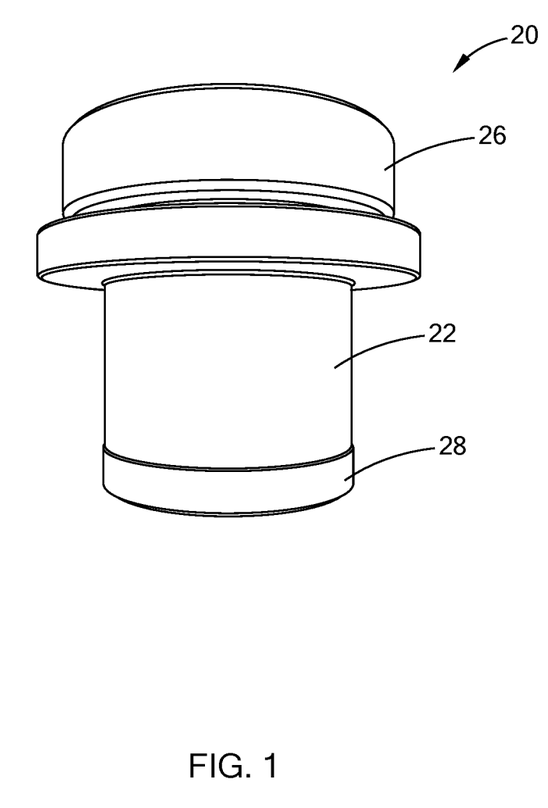
FIG. 1 is a side view of a device for measuring dimensional variation of a part constructed in accordance with the teachings of the present disclosure.
Figure 2:
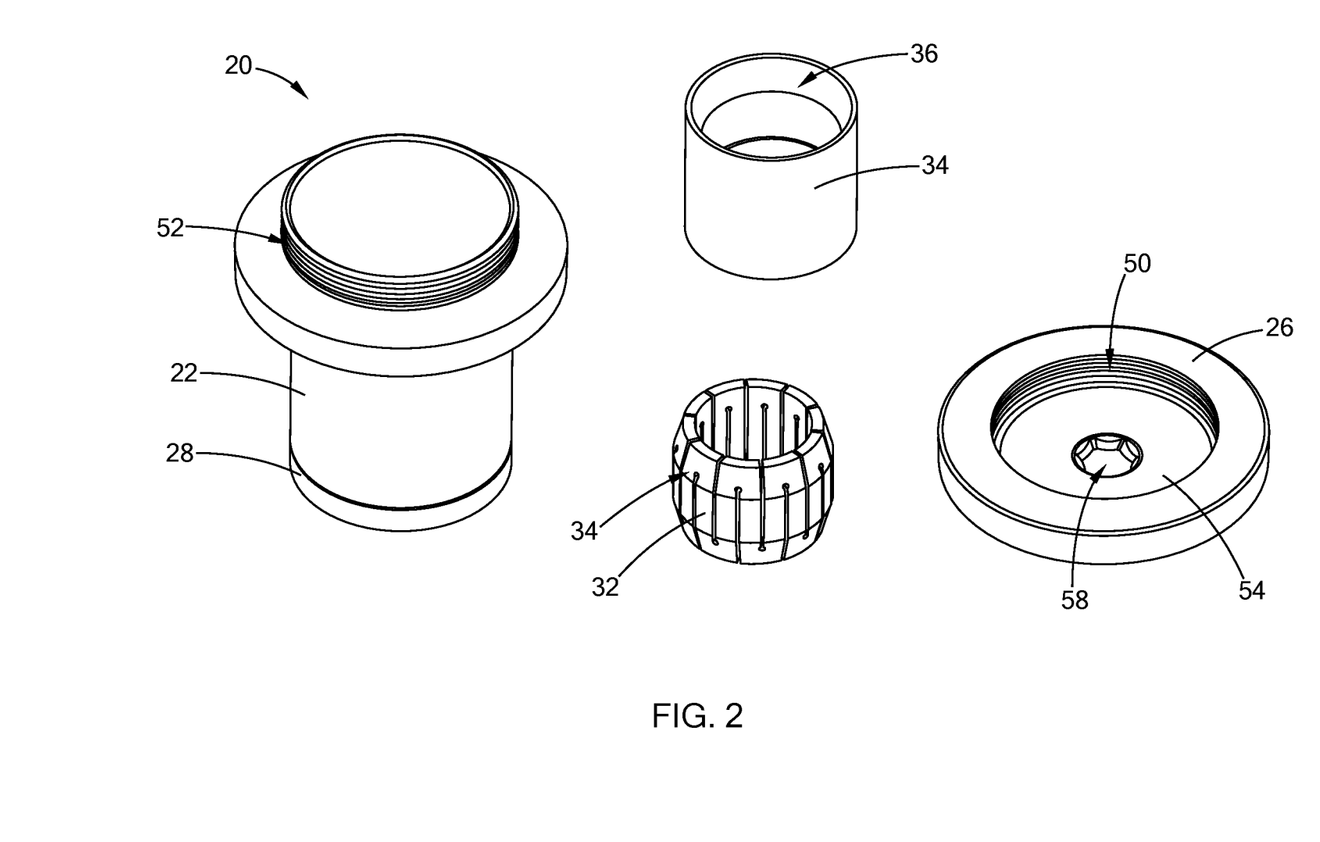
FIG. 2 is a perspective view of the device of FIG. 1 partially disassembled.
Figure 3A:
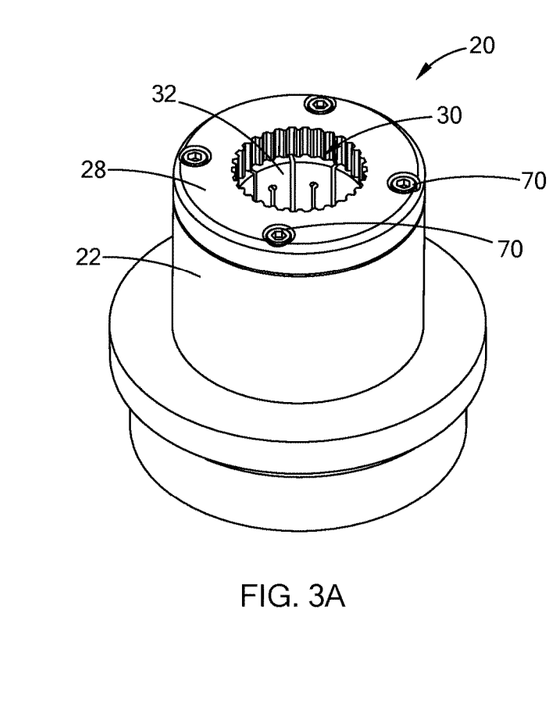
FIG. 3A is a perspective view of the device of FIG. 1 fully assembled.
Figure 3B:
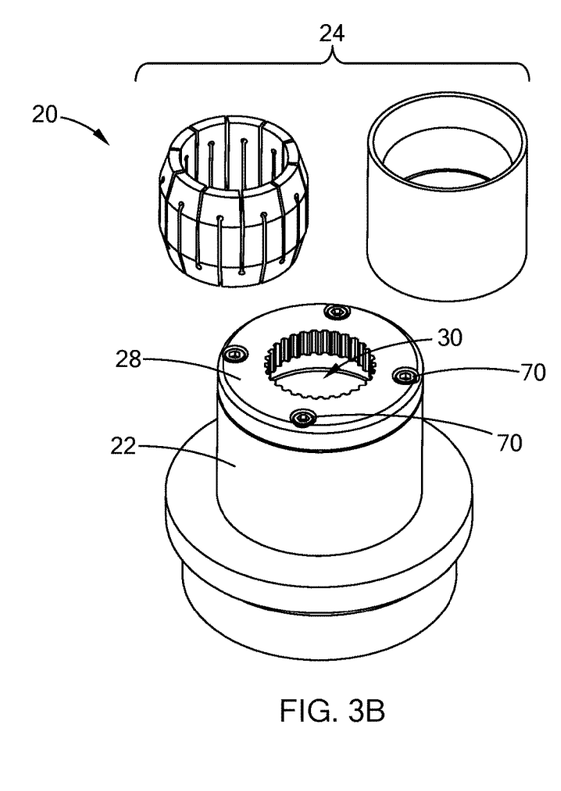
FIG. 3B is another perspective view of the device of FIG. 1 partially disassembled and showing a collet and a collet actuator according to the teachings of the present disclosure.
Figure 4:
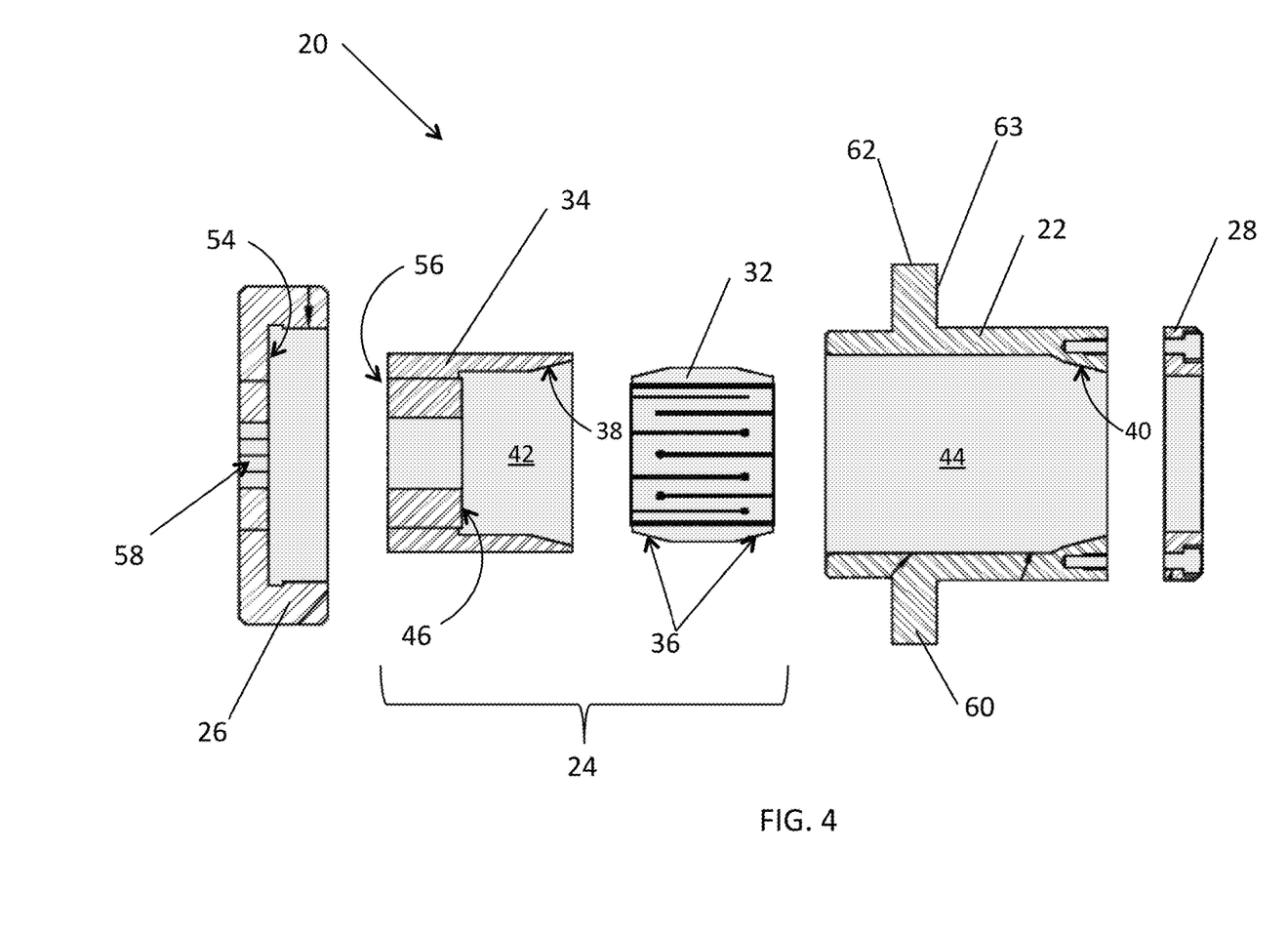
FIG. 4 is an exploded side cross-sectional side view of the device of FIG. 1.

As shown in FIGS. 2 and 4, in this form, the clamping device 24 comprises a collet 32 and a collet actuator body 34. It should be understood that other forms of clamping devices other than a collet 32 and collet actuator body 34 should be construed as falling within the scope of the present disclosure. The collet 32 and collet actuator body 34 are configured to engage the splines 12 of the shaft 10 when the device 20 is secured thereto. More specifically, the collet 32 defines opposed ramped surfaces 36, and the collet actuator body 34 defines a mating ramped surface 38. Similarly, the indicator check body 22 also defines a mating ramped surface 40. In this form, the ramped surfaces 36, 38, and 40 define a linear taper. Accordingly, when the device 20 is tightened onto the shaft, the ramped surfaces 38 and 40 of the collet actuator body 34 and the indicator check body 22, respectively, cause the collet 32 to compress and engage the splines 12 of the shaft 10, which is illustrated in greater detail below.

Figure 6:
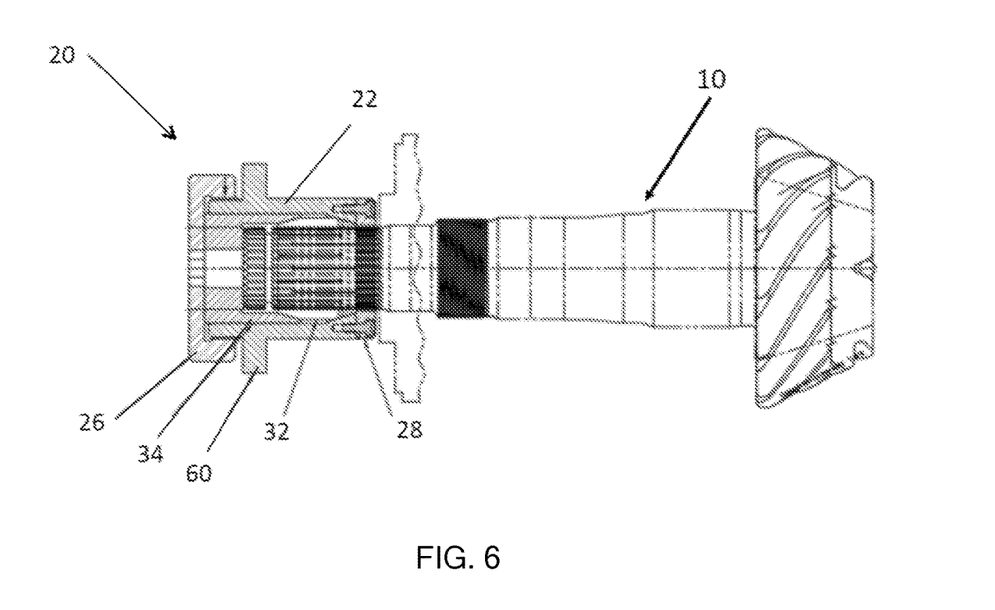
FIG. 6 is a side cross-sectional view of the device for measuring dimensional variation installed onto external splines of a hypoid pinion shaft in accordance with the teachings of the present disclosure.
Figure 7:
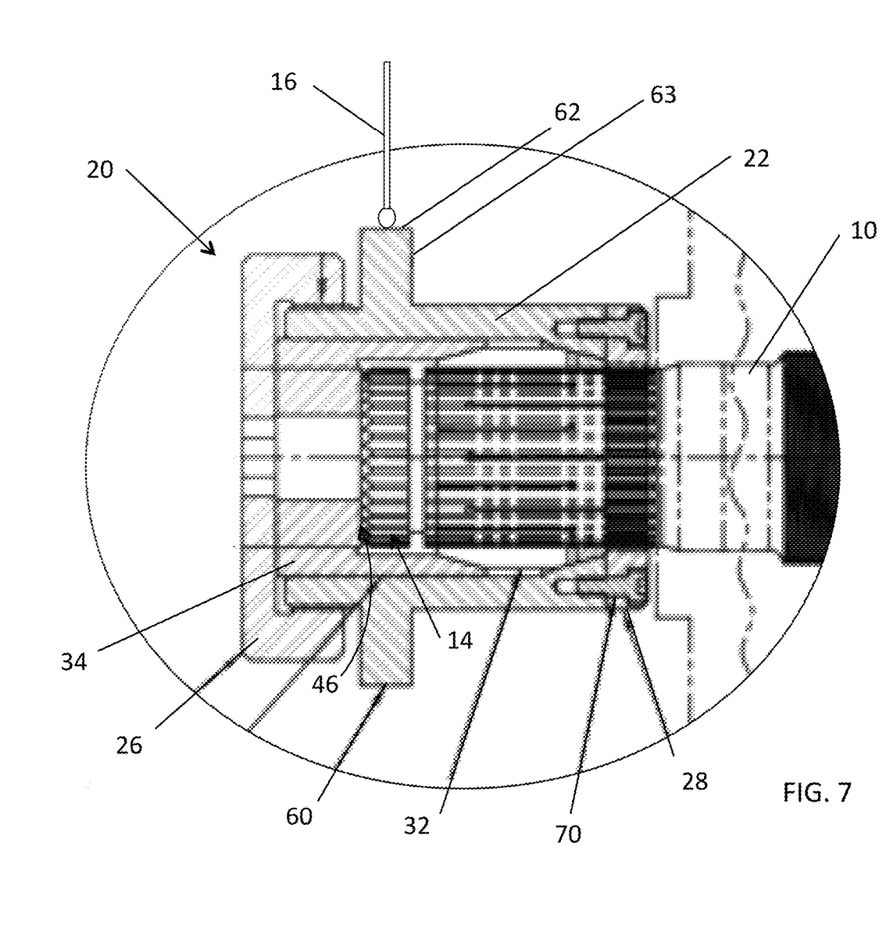
FIG. 7 is an enlarged view of the device of FIG. 6 installed onto external splines.

As also shown in FIGS. 4, 6 and 7, when assembled, the collet 32 is disposed within a cavity 42 of the collet actuator body 34 and also within a bore 44 of the indicator check body 22. More specifically, the collet 32 is received within the cavity 42 of the collet actuator body 34, and the collet actuator body 34 and the collet 32 are received within the bore 44 of the indicator check body 22. In one form, a fit between an outer diameter of the collet actuator body 34 and an inner diameter of the indicator check body 22 is a clearance fit. As further shown, the collet actuator body 34 defines an inner top surface 46 that is adapted to engage/abut an end portion 14 of the shaft 10 to locate the device 20 relative to the shaft 10.

Referring now to FIGS. 2 and 4, the end cap 26 defines internal threads 50, which mate with external threads 52 on the indicator check body 22. Further, the end cap 26 defines an inner face 54 that is adapted to engage an end portion 56 of the collet actuator body 34. The end cap 26 further comprises a tool engagement feature 58 as shown.

For assembly of the device 20, the collet 32 is placed inside the cavity 42 of the collet actuator 34, and this assembly is placed inside the bore 44 indicator check body 22. The anti-rotation member 28 is secured to the indicator check body 22 (described in greater detail below) either before or after the clamping device 24 is inserted within bore 44 the indicator check body 22. The end cap 26 is threaded onto the indicator check body 22, and its inner face 54 engages the end portion 56 of the collet actuator body 34 as the end cap 26 is tightened. As the end cap 26 is further tightened, which may be with a tool (not shown) within the tool engagement feature 58 in one form, the collet actuator body 34 is engaged by the inner face 54, thus forcing the mating ramped surface 38 of the collet actuator body 34 against the ramped surface 36 of the collet 32, which then forces the opposite ramped surface 36 of the collet 32 against the mating ramped surface 40 of the indicator check body 22. This action, in turn, compresses the collet 32 and causes the collet 32 to engage, or forcibly clamp around the splines 12 of the shaft 10, which is described in greater detail below. It should be understood that this action and clamping of the collet 32 may be employed around a surface that is not splined while remaining within the scope of the present disclosure.

Referring to FIGS. 4, 6 and 7, the indicator check body 22 further comprises an external flange 60 defining at least one surface 62, 63 against which dimensional variation is measured. After the device 20 is installed, both the device 20 and the shaft 10 are rotated using the tool engagement feature 58. A probe 16 is placed against a surface 62, 63 as shown in order to measure dimensional variation of the shaft 10, which is described in greater detail below. Such dimensional variation may include, by way of example, runout and total runout, among other geometric variation.

Referring to FIGS. 3A-3B, 6, and 7, the anti-rotation member 28 includes the splined inner diameter 30, which is configured to engage the external splines 12 of the shaft 10. In this form, the anti-rotation member 28 is bolted to the indicator check body 22 through the use of four (4) evenly spaced bolts 70 as shown. The heads of the bolts 70 are recessed so as to not interfere with the shaft 10, or components of the shaft when the device 20 is installed. Since the splined inner diameter 30 engages the external splines 12 of the shaft 10, and the anti-rotation member 28 is fixed to the indicator check body 22, which is in turn secured to the end cap 26, the entire device 20 rotates with the shaft 10 when installed.

As shown in FIGS. 6 and 7, for installation, the completely assembled device 20 is inserted over the shaft, and more specifically, the splined inner diameter 30 of the anti-rotation member 28 is slid onto the splines 12 until the end portion 14 of the shaft 10 abuts the inner top surface 46 of the collet actuator body 34. The end cap 26 is then rotated (clockwise or counterclockwise depending on thread directions) such that its internal threads 50 traverse the external threads 52 of the indicator check body 22. As set forth above, the inner face 54 of the end cap 26 engages the collet actuator body 34, thus forcing the mating ramped surface 38 of the collet actuator body 34 against the ramped surface 36 of the collet 32, which then forces the opposite ramped surface 36 of the collet 32 against the mating ramped surface 40 of the indicator check body 22. This action, in turn, compresses the collet 32 and causes the collet 32 to engage, or forcibly clamp around the splines 12 of the shaft 10. As a result, the device 20 is then securely positioned against the shaft 10 and is ready for measuring dimensional variation.

Figure 8:
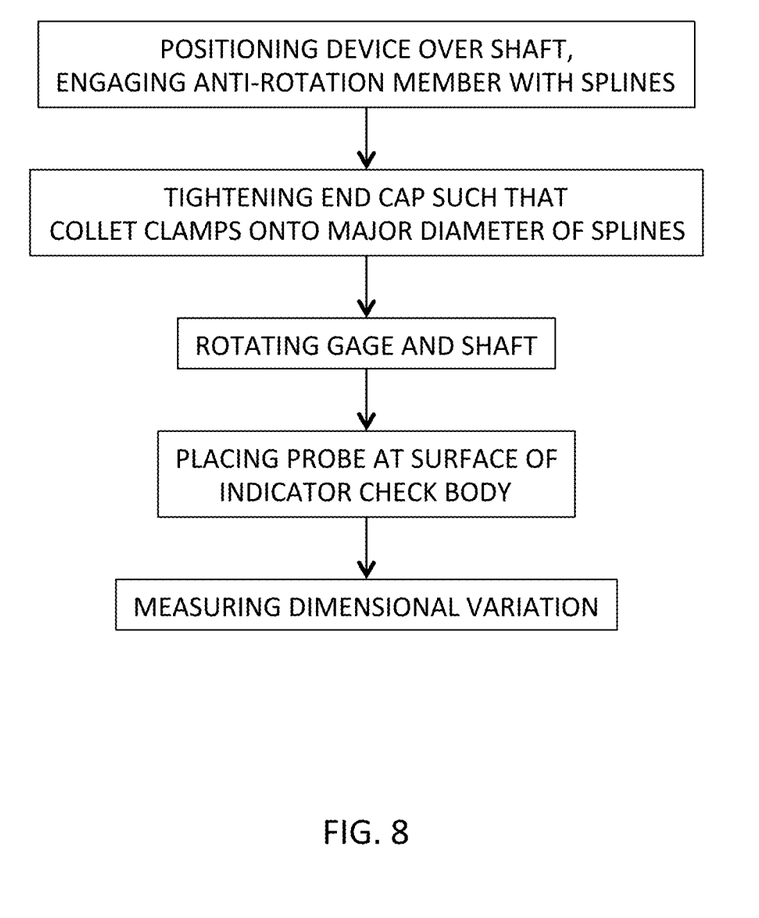
FIG. 8 is a flow diagram illustrating a method of measuring dimensional variation of a shaft having splines according to the teachings of the present disclosure.

Referring to FIGS. 7 and 8, a method of measuring dimensional variation of the shaft 10 having splines 12, or dimensional variation of any rotation geometry is shown. The method comprises positioning the device 20 (or gage in one form) over the shaft 10 and engaging the anti-rotation member 28 with the splines 12. Next, the end cap 26 is tightened such that the collet 32 clamps onto a major diameter of the splines 12. The gage 20 and the shaft 12 are rotated, and a probe 16 is placed at surfaces 62, 63 of the indicator check body 22 to measure dimensional variation of the shaft 10. More specifically, when the collet 32 is clamped onto a major diameter of the splines 12, dimensional variation, including runout and total runout can be measured. For example, when the probe 16 is fixed in a specific axial location on the surface 62, radial runout can be measured. If the probe 16 is placed at the surface 63, axial runout can be measured, among other dimensional variations. With the tight tolerances and geometric relationships between the device 20 and the shaft 12, a variety of specific dimensional variations may be measured depending on where the probe 16 is placed on the indicator check body 32. Accordingly, the flange 60 may take on any number of shapes and sizes in order to accurately measure runout, total runout, and other dimensional variations.

In one form, the components of the device 20 are a tool steel material. However, it should be understood that other materials may be employed while remaining within the scope of the present disclosure.

The description of the disclosure is merely exemplary in nature and, thus, dimensional variations that do not depart from the substance of the disclosure are intended to be within the scope of the disclosure. Such dimensional variations are not to be regarded as a departure from the spirit and scope of the disclosure.

What is claimed is:

1. A device for measuring dimensional variation of a part comprising:
   an indicator check body;
   a clamping device disposed within the indicator check body; and
   an end cap adapted for engagement with the indicator check body and the clamping device,
   wherein when the indicator check body and the clamping device are engaged, the device is secured to the part and dimensional variation is measured along at least one surface of the indicator check body.

2. The device according to claim 1 further comprising an anti-rotation member secured to the indicator check body, the anti-rotation member adapted to be secured to the part.

3. The device according to claim 2, wherein the part is a shaft having external splines, and the anti-rotation member defines a splined inner diameter configured to engage the external splines of the shaft.

4. The device according to claim 1, wherein the clamping device comprises a collet disposed inside a collet actuator body and the indicator check body.

5. The device according to claim 4, wherein the collet actuator body defines an inner top surface that is adapted to engage an end portion of the part to locate the device relative to the part.

6. The device according to claim 1, wherein the end cap defines internal threads, and the indicator check body defines mating external threads.

7. The device according to claim 1, wherein the end cap defines an inner face that is adapted to engage an end portion of the clamping device.

8. The device according to claim 1, wherein the end cap further comprises a tool engagement feature.

9. The device according to claim 1, wherein a fit between the indicator check body and the clamping device is a clearance fit.

10. A gage for measuring dimensional variation of a shaft having splines comprising:
    a collet;
    a collet actuator disposed around the collet;
    an indicator check body disposed around the collet actuator;
    an anti-rotation ring secured to a distal end portion of the indicator check body and adapted to engage the splines of the shaft; and
    an end cap secured to a proximal end portion of the indicator check body.

11. The gage according to claim 10, wherein the anti-ring defines a splined inner diameter configured to engage the splines of the shaft.

12. The gage according to claim 10, wherein the collet actuator body defines an inner top surface that is adapted to engage an end portion of the shaft to locate the gage relative to the shaft.

13. The gage according to claim 1, wherein the end cap defines internal threads, and the indicator check body defines mating external threads.

14. The gage according to claim 1, wherein the end cap defines an inner face that is adapted to engage an end portion of the collet actuator.

15. The gage according to claim 1, wherein the end cap further comprises a tool engagement feature.

16. The gage according to claim 1, wherein a fit between the indicator check body and the collet actuator is a clearance fit.

17. The gage according to claim 10, wherein the indicator check body comprises an external flange defining at least one surface against which dimensional variation is measured.

18. A method of measuring dimensional variation of a shaft having splines comprising:
    positioning the gage of claim 10 over the shaft and engaging the anti-rotation member with the splines;
    tightening the end cap such that the collet clamps onto a major diameter of the splines;
    rotating the gage and the shaft; and
    placing a probe at a surface of the indicator check body and measuring dimensional variation of the shaft.

19. The method according to claim 18, wherein the gage is rotated by engaging a tool with the end cap.

20. The method according to claim 18 further comprising the step of engaging an inner top surface of the collet actuator body against an end portion of the shaft to locate the gage relative to the shaft.

* * * * *